United States Patent
Arlitt et al.

(10) Patent No.: US 8,051,162 B2
(45) Date of Patent: Nov. 1, 2011

(54) DATA ASSURANCE IN SERVER CONSOLIDATION

(75) Inventors: Martin F. Arlitt, Calgary (CA); Keith I. Farkas, San Carlos, CA (US); Jerome Rolia, Kanata (CA); Marie-Jo Fremont, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1312 days.

(21) Appl. No.: 11/495,365

(22) Filed: Jul. 28, 2006

(65) Prior Publication Data

US 2008/0027961 A1 Jan. 31, 2008

(51) Int. Cl.
*G06F 15/177* (2006.01)
(52) U.S. Cl. ........ 709/224; 709/223; 709/203; 702/186; 702/187; 702/182
(58) Field of Classification Search .................. 709/224, 709/223, 203; 702/182, 186, 187, 188
See application file for complete search history.

(56) References Cited

U.S. PATENT DOCUMENTS

| 6,148,335 | A | 11/2000 | Haggard et al. |
| 6,260,020 | B1 | 7/2001 | Ruffin et al. |
| 7,506,361 | B2 | 3/2009 | Kegel et al. |
| 2002/0140743 | A1 | 10/2002 | De Lca et al. |
| 2003/0225563 | A1 | 12/2003 | Gonos |
| 2004/0034577 | A1 | 2/2004 | Van Hoose et al. |
| 2004/0167906 | A1 | 8/2004 | Smith et al. |
| 2006/0173875 | A1* | 8/2006 | Stefaniak ............... 707/101 |
| 2006/0179171 | A1 | 8/2006 | Stefaniak et al. |
| 2006/0282825 | A1 | 12/2006 | Taylor |
| 2007/0028239 | A1 | 2/2007 | Dyck et al. |
| 2007/0094375 | A1 | 4/2007 | Snyder et al. |
| 2007/0226341 | A1 | 9/2007 | Mateo |
| 2007/0255814 | A1 | 11/2007 | Green et al. |

* cited by examiner

*Primary Examiner* — Kenneth R Coulter

(57) ABSTRACT

A method for data assurance in server consolidation is provided. The method includes collecting an inventory of a plurality of source servers in a desired environment and performance data of such source servers, evaluating and checking a data structure of the performance data, applying predetermined time stamps, checks, and statistic computations to the performance data, and evaluating a data quality of the performance data.

20 Claims, 14 Drawing Sheets

STAGE 2, 420

US 8,051,162 B2

DATA ASSURANCE IN SERVER CONSOLIDATION

CROSS-REFERENCE

This application is related to U.S. patent application Ser. No. 11/412,347, entitled, "SERVER CONSOLIDATION", filed on Apr. 27, 2006, and U.S. patent application Ser. No. 11/413,349, entitled, "PERFORMANCE-DATA BASED SERVER CONSOLIDATION," filed on Apr. 28, 2006, all of which are herein incorporated by reference in its entirety.

BACKGROUND

Businesses are interested in consolidating software applications that run on individual, often under-utilized, servers onto a smaller number of more highly used ones. Such server consolidation is difficult to do as many technological and business factors need to be taken into account and large numbers of servers are typically involved. Relatively common consolidation projects typically involve the consolidation of a few hundred servers. Thus, the amount of performance data that needs to be gathered for analyzing server utilization and identifying performance bottlenecks in an information technology (IT) system or infrastructure is staggering, causing many users to rely only on summarized performance data (such as average or peak CPU utilization) for the analysis. For example, one approach for gathering performance data of an IT system is to instrument such a system to gather data about usage patterns of its computing resources, such as CPUs, disks, network cards, and memory, in the system servers. Because such performance data is typically gathered at regular intervals and over a period of time, the resulting accumulated data is potentially quite large.

As referred herein, and as understood in the art, information technology, or IT, encompasses all forms of technology, including but not limited to the design, development, installation, and implementation of hardware and software information systems and software applications, used to create, store, exchange and utilize information in its various forms including but not limited to business data, conversations, still images, motion pictures and multimedia presentations technology and with the design, development, installation, and implementation of information systems and applications.

Also, as referred herein, a server is a computer or network of computers. Examples of a server include but are not limited to one or more desktop computers, one or more laptop computers, one or more mainframe computers, one or more networked computers, one or more processor-based devices, or any similar types of systems and devices. Thus, a server includes one or more processors of any of a number of computer processors, such as processors from Intel, Motorola, AMD, Cyrix. Each processor is coupled to or includes at least one memory device, such as a computer readable medium (CRM). The processor is operable to execute computer-executable program instructions stored in the CRM, such as program code of applications, to run the applications. The computer-executable program instructions include code from any suitable computer-programming language, such as C, C++, C#, Java, or the like. Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor can read instructions.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
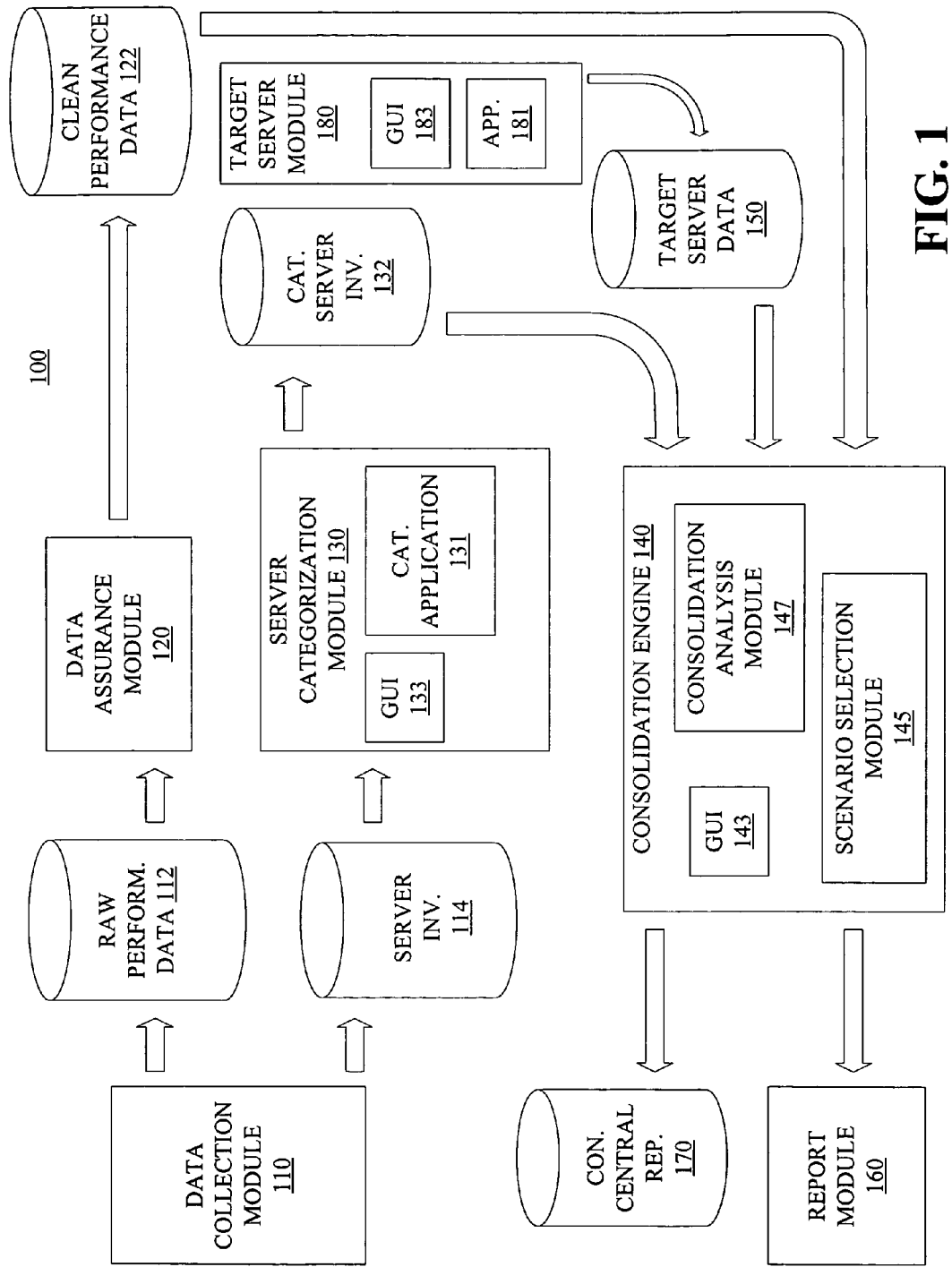
FIG. 1 illustrates a high-level architecture 100 for server consolidation, in accordance with one embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

In practical implementation of server consolidation, a number of imperfections exist in the performance data that is monitored. These imperfections potentially affect the quality of consolidation analyses and recommendations. Also, consolidation recommendations are empirically driven, and they typically are based on a large amount of data as aforementioned. For example, it is possible to have consolidation recommendations that are based on recording the values of 8 performance metrics for 1000 systems for 2 months at 5-minute intervals (over 100 million values). Due to the large amount of data involved, it is very inefficient for users to manually and consistently check the monitored data, correct any problems with the data, and assess the overall quality of such data. As referred herein, users are IT consultants, IT managers, system administrators, or any other entities that are interested in consolidating servers, rebalancing workloads of the servers, or planning future server capacity. To illustrate the time involved, consider a scenario in which a user prepares each month a set of reports detailing the CPU and memory utilization of approximately 40 applications running on four 16-processor computer systems. Even if only 2 performance metrics being collected every 5 minutes for 90 instances of the 40 applications, it may take the user hours each month to check the data and correct it. Additionally, because this checking is done manually, the user must use personal intuition to determine whether the data quality for a given application is sufficient, with the possible effect that the data sets for different applications are assessed differently or inconsistently. Consequently, imperfections in the data are potentially overlooked owing to the difficulty in finding them and the amount of time required to do so, or the manual check is simply not done because it is so tedious.

Described herein are methods and systems for automatically detecting a number of imperfections in the monitoring of data about usage patterns of the computing resources, correcting the imperfections, and quantifying their impact on a consolidation analysis to thereby improve the quality of recommendations for server consolidation in a desired IT environment, and hence, the trust placed in such recommendations. Also described herein are embodiments that allow users to diagnose performance issues with existing IT systems, whereby such large-scale diagnosis is helpful in identifying important system configurations.

In one embodiment, there is provided a server consolidation tool that is operable with any data collectors, wherein it is possible to conduct data analyses in the user's environment. In another embodiment, a server consolidation tool is provided to the user with a combined checklist (or summary) and navigator with a graphical user interface (GUI) to enable the user to achieve server consolidation with the desired quality and consistency. Other embodiments offer users a high degree of flexibility in server consolidation by allowing the users to skip steps, come back to a step, choose a singular or plural forms (for example, in one or more selected groups of servers, scenarios, and consolidation constraints), and select numerous options and choices in the process. Users are also offered choices in defining groups and scenarios, designating or marking servers with one of a plurality of usability statuses to indicate how each marked server is to be used in the server consolidation. In one embodiment, the usability statuses include a Replace status, a Reuse status, an Undecided (or don't know) status, and an Unchanged (or don't touch) status, as described later. Furthermore, users are offered choices in articulating consolidation constraints and many other key elements of the analysis, as also described later. In one embodiment the user gets results back through reports. In another embodiment the user has direct access to data in a repository for data mining and creating further reports. As referred herein, users are IT consultants, IT managers, system administrators, or any other entities that are interested in consolidating servers, rebalancing workloads of the servers, planning future server capacity, or providing server consolidation services with any combination of the first three.

FIG. 1 illustrates a high-level system architecture 100 for server consolidation in accordance with one embodiment. However, alternative embodiments of server consolidation that operate with different systems are contemplated, as understood from the present disclosure. In FIG. 1, one or more data collectors are employed for the data collection module 110. In one embodiment, a data collector is one or more software programs, applications, or modules. The data collectors are used to discover and inventory those servers within a desired environment that need to be consolidated and to collect raw performance data of such source servers (hereinafter, "source servers"). For example, a desired environment is the entire information technology (IT) infrastructure of a company, and the servers that are detected and inventoried are those that are parts of or belong to such IT infrastructure.

In contrast to prior art consolidation tools, it is possible to employ any known data collector or collectors for the data collection module 110 because of the flexibility of the server consolidation architecture 100 to independently operate with any and all data collectors, so long as the collected data is collected appropriately by the data collector for input into the server consolidation tool. Examples of possible data collectors include but are not limited to: HP ASSET and OPENVIEW softwares from Hewlett Packard Company of Palo Alto, Calif., BMC DISCOVERY EXPRESS from BMC Software, Inc. of Houston, Tex.; and those data collectors available in the AOG CAPACITYPLANNER software and CDAT software from IBM Corporation of Amonk, N.Y.

Referring back to FIG. 1, the inventory 114 of the source servers and the raw performance data 112 are processed separately, wherein the raw performance data 112 is subjected to processing by the data assurance module 120 to generate clean performance data 122, and the server inventory 114 is subjected to processing by server categorization module 130. In one embodiment, data assurance is automatically performed by the data assurance module 120, which is one or more software programs, applications, or modules having computer-executable program instructions that include code from any suitable computer-programming language, such as C, C++, C#, Java, or the like. In an alternative embodiment, data assurance is performed manually by a user reviewing the collected raw performance data based on predefined data assurance rules (for example, specifying data conditions that are considered abnormal performance) and deciding to include or exclude servers in the consolidation based on data or performance issues gathered from the review. As the clean performance data 122 is collected, it is fed to the consolidation engine 140. Alternatively, the clean performance data 122 is saved in an accessible storage space, such as a database, for access by the consolidation engine 140 as required or desired. The data assurance module 120 is further described later.

At server categorization module 130, the server inventory 114 is processed for further categorization to generate a categorized server inventory 132. In one embodiment, the server categorization module 130 is performed by one or more categorization software programs, applications, or modules 131, wherein the user is provided with a graphical user interface (GUI) 133 to select predetermined fields of criteria or filters for the server categorization or fill in additional categorization fields as desired or needed for the server categorization. The criteria or filters for server categorization are potentially determined by the user and based on, for example, server characteristics such as server location, functionality, environment, specification, or any combination thereof. Alternatively, the GUI 133 is operable to allow the user to select individual servers from a list in the server inventory 114. Thus, as referred herein, those tasks or functions performed by the server categorization 130 are performed by the underlying categorization software application; whereas, any interactions between server categorization module 130 and users are done via the GUI 133.

At target servers data module 180, data relating to the user-selected target platform for new servers to be used for server consolidation (hereinafter, "target server" or "consolidated server") is generated. As referred herein, a target platform is the underlying hardware, and associated software, used to implement a server. Thus, the target platform is, for example, a particular type of computer or type(s) of network of computers used to implement the server. In one embodiment, the target servers data module 180 includes one or more software programs, applications, or modules 181, wherein the user is provided with a GUI 183 to allow the user to select a target hardware or platform from a list of candidate server models, available from one or more server manufacturers, for new servers to be used in the server consolidation. Alternatively, the user relies on automated, predetermined policies, as programmed in the software application 181, to select a target platform based on the user's input of one or more conditions or specifications. For example, the user specifies one or more criteria for selecting a target platform, such as selecting a target platform based on power specifications. The selected target platform and its characteristics are output as the target servers data 150. In one embodiment, the GUI 183 of the target servers data module 180 is integrated with the GUI 143 of the consolidation engine 140. Alternatively, the GUI 183 is separate and distinct from the GUI 143.

The clean performance data 122, the categorized server inventory data 132, and the target servers data 150 are fed into a consolidation engine 140, which is used to further define and analyze a proposed server consolidation scenario, as will be described later. According to one embodiment, the consolidation engine 140 includes a scenario selection module 145 and a consolidation analysis module 147 that interface with users via a GUI 143. In one embodiment, each of the modules 145 and 147 includes one or more software programs, applications, or modules. The GUI 143 is menu-based or screen-based to display different menus or screens (for example, web pages) to allow different inputs from users for various server consolidation tasks performed by the underlying modules 145 and 147. For example, the GUI 143 is operable to allow the user to select a particular consolidation algorithm and set optional input parameters with the selected algorithm such as the initial number of new servers. Thus, as referred herein, those tasks or functions performed by the consolidation engine 140 are performed by the underlying modules 145 and 147, and any interactions between the consolidation engine 140 and users are done via the GUI 143. The server consolidation tasks are further described below.

The results of the consolidation analysis is output from consolidation engine 140 to a report software module 160 for the generation of reports for the user to review. The results are also saved in a consolidation central repository 170, such as a CRM, for future reference. The server consolidation process and tasks are further described in the aforementioned U.S. application Ser. No. 11/412,347, which is herein incorporated by reference in its entirety.

According to one embodiment, the quality of the monitored raw performance data 112 is assessed to determine whether such data is of sufficient quality for use in a consolidation analysis. This quality assessment includes the use of the data assurance module 120 to clean the raw performance data 112 of the source servers. The data assurance module (DAM) 120 is desirable because, as mentioned earlier, in practice a number of imperfections exist in the collected raw performance data 112, and such imperfections affect the quality of consolidation analyses and recommendations. Thus, in one embodiment, the data assurance module 120 implements a set of error rules, or data assurance rules, for checking and correcting the monitored data 112 and assessing its quality before such data is used for a consolidation analysis.

The error rules check the monitored data for a predefined set of imperfections, correct at least some of the monitored data, assess the quality of the monitored data, and generate recommendations as to whether it is of sufficient quality to use in a consolidation analysis. The aforementioned error rules and the order in which they are applied to the monitored data are described below, wherein the monitored data is extracted from the monitored computing resources into a data file for processing. However, alternative embodiments are contemplated wherein the monitored data is first saved in a database, whereby the monitored data 112 potentially represents such a database, from which the monitored data is subsequently retrieved for processing by the data assurance module 120.

In one embodiment, the monitored data is represented as a time series with rows $(T_i, a_{1i}, a_{2i}, \ldots, a_{ni})$ for each source server, where $T_i$ is the time stamp for time interval i, and $a_{1i}, a_{2i}, \ldots, a_{ni}$ are the corresponding values of the desired performance metrics at time interval i. Thus, an error-free time series, hereinafter referred to as a "trace," has monotonically or linearly increasing time stamps that are separated by a constant time increment or time step, for example, five (5) minutes. Alternative embodiments are contemplated wherein the monitored data is represented as chronologically-ordered sequences of the monitored data rather than time series. In other words, each set of data is not separated by a constant time increment $T_i$. For example, a chronologically-ordered sequence can be represented by (a, b, c, d, e, f, . . . ), where a, b, c, d, e are chronologically-ordered (in time) sequence of performance metrics, such as a log of events. Thus, the monitored data is represented as multiple chronologically-ordered sequences, or multiple logs of events, with the logs not separated by a time constant $T_i$ but by the necessary time it takes to accumulate such log.

Referring back to the time series, or trace, the data assurance module (DAM) 120 receives an input trace of each server from the monitored raw performance data 112, processes the input trace to check for imperfections and correct at least one or more such imperfections, and produces a corresponding output trace as clean performance data 122. All output traces have the same sequence of time stamps, $T_1$, $T_2, \ldots, T_m$, that is, all output traces have the same time base. Each data row in the output trace is expected to have a time stamp that is greater than the time stamp of the preceding row by a constant amount. This constant is called the expected time interval, or Trace_DataRowInterval, as defined by:

$$\text{Trace\_DataRowInterval} = T_i - T_{i-1}.$$

In one embodiment, the value of Trace_DataRowInterval is provided as part of the metadata in the monitored raw performance data 112 and verified by the above equation. Alternatively, when such a value is not provided, the most common interval in a trace is chosen as the nominal value for Trace_DataRowInterval.

In one embodiment, the error rules as implemented by the DAM 120 are based on an understanding of the various different data collection problems and imperfections that may be encountered in data collection. These rules then can be uniformly applied by any user, whether or not such a user is familiar with the various different data collection problems that rules seek to address. Thus, it is important to determine these problems and imperfections prior to crafting appropriate error rules to address such problems and imperfections. For instance, a number of data collection problems arise from timing problems in the data collection process. In turn, these timing problems are related to either the local time on each server from which performance data is collected or the way in which such data is collected. Such timing problems impact the consolidation analysis by the consolidation engine 140 in a number of ways, as discussed below. Embodiments of error rules for addressing these timing problems are also discussed below.

Figure 2:
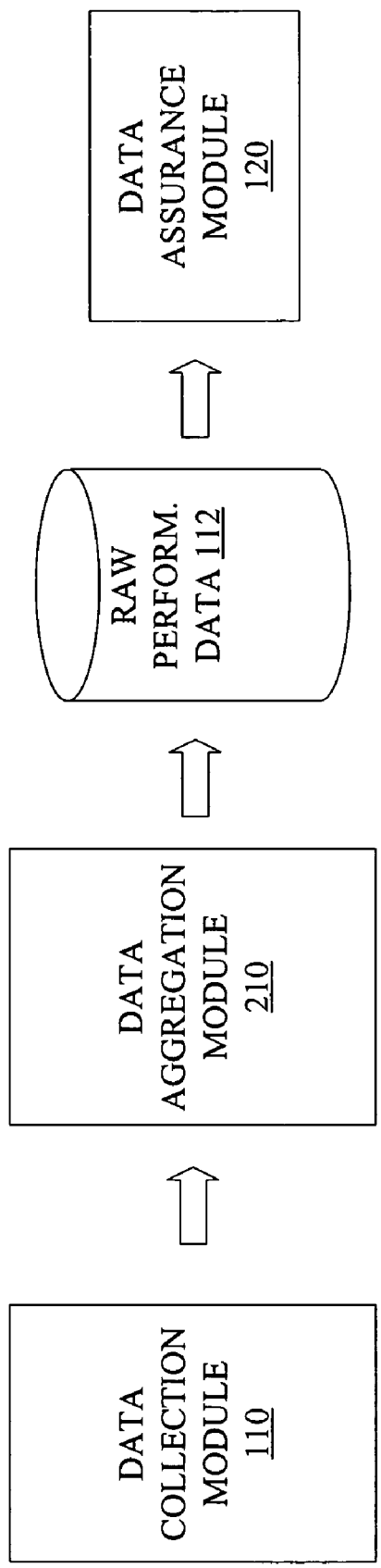
FIG. 2 illustrates a data aggregation module that is applicable in the architecture 100 depicted FIG. 1, in accordance with one embodiment.

One possible timing problem relating to the local time on each server, and its impact on the consolidation analysis, is the lack of synchronization of the system clocks on all servers from which performance data is collected. If these system clocks are not synchronized to a global clock using, for example, a network time protocol or Global Positioning System (GPS), a solution is desired to generate input traces with the same time base as discussed earlier. In one embodiment, as shown in FIG. 2, there is provided a data aggregation module (hereinafter, "data aggregator") 210, which pulls or retrieves performance data from the data collection module 110 and stores such data in a database. The data aggregator 210 is operable to query each server for its local time when it retrieves the input trace from the server, and rewrites the time stamps, $T_i$, in the input trace, factoring out the difference T in time stamps.

There are a number of possible timing problems relating to the way in which performance data of servers is collected. One of such timing problems results from a data collector in the data collection module 110 time-stamping the input traces with the local time and not a universal time zone, such as Greenwich Mean Time (GMT). For example, when data collection overlaps the ending of daylight savings time, one hour's worth of extra data is generated owing to the difference in time stamps, T, being negative (i.e, the system clock rolling back one hour).

Figure 3:
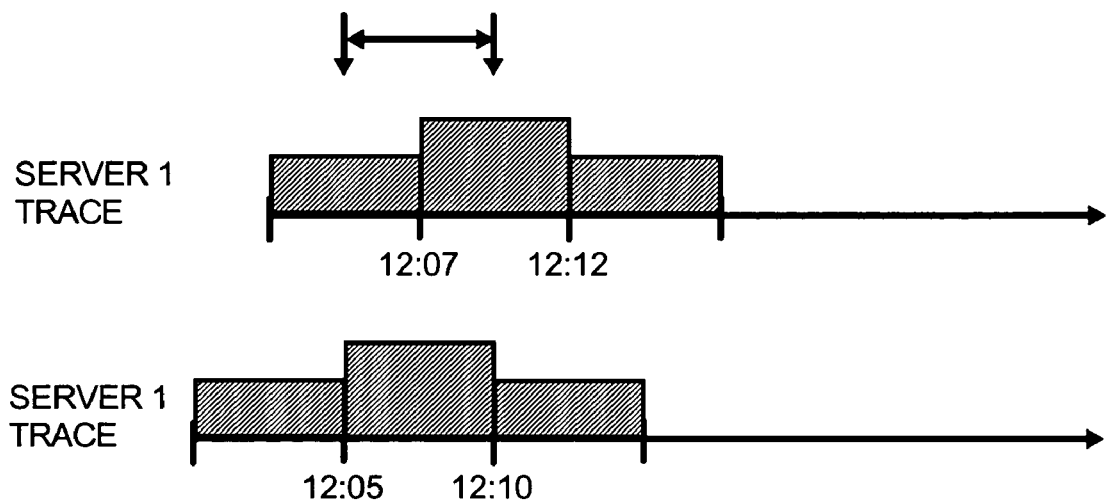
FIG. 3 illustrates a possible timing problem in server consolidation, in accordance with one embodiment.

Another possible timing problem relating to data collection occurs when there are multiple data collectors in the data collection module 110 being used to collect performance data from multiple servers, and there is no agreement among the data collectors about the time to assign to the data rows in a trace. This problem occurs, for example, when one data collector starts collecting performance data at 12:00 PM (that is, time-stamp-for-first-data-row=12:00 PM) and assigns time stamps of 12:05, 12:10, . . . to the data rows in an input trace, and a second data collector starts collecting performance data at 12:02 PM (that is, time-stamp-for-first-data-row=12:02 PM) and assigns time stamps of 12:07, 12:12, . . . to the data rows in another input trace, as shown in FIG. 3. This problem occurs because some data collectors may not align their sampling boundaries to specific global times. In other words, the modulus or mod(time-stamp-for-first-data-row, Sampling Interval) is not a global constant, where Sampling Interval is the expected time between samples in each input trace, regardless whether the local clocks at the servers are synchronized. In one solution, this timing problem is ignored and the time stamps are rewritten. For example, the time stamps for the second data collector are rewritten from 12:07 PM to 12:05 PM, 12:12 PM to 12:10 PM, and so on. In another solution, each of the input traces is sampled using the output trace's expected series of time stamps, and the maximum data value within each sample window is set as the performance data collected at that particular time interval.

Still another possible timing problem relating to data collection occurs when the time between samples for a given server is not constant, one or more servers use a sampling interval that is not equal to Trace_DataRowInterval, or both. This timing problem potentially occurs because of a bug in a given data collector, the way in which it is designed to operate, or because the load on the system under study is such that the data collector cannot always run at the programmed desired intervals. Consolidation analysis at the consolidation engine 140 is affected because, as mentioned earlier, the output traces of all servers are expected to have the same time base. One solution to this particular timing problem is to rewrite the time stamps and reject any resulting extra rows. Another solution is to sample each input trace using the output trace's expected series of time stamps, and take the maximum value within each sample window as the performance data collected at that particular time interval, as again shown in FIG. 3. Other solutions (linear interpolations, extrapolation, etc.) may be used to rewrite the trace.

Accordingly, the data assurance or error rules as implemented by the DAM 120 to correct at least some of the aforementioned timing problems and other data imperfections are now described with reference to the process flow 400 illustrated in FIG. 4, in accordance with one embodiment. The process 400, or any part thereof, is potentially performed by users who are, for example, in-house IT personnel in an organization wishing to consolidate the organization's IT assets, IT consultants providing consolidation services to their customers, or a combination of both in-house IT personnel and outside IT consultants.

Figure 4:
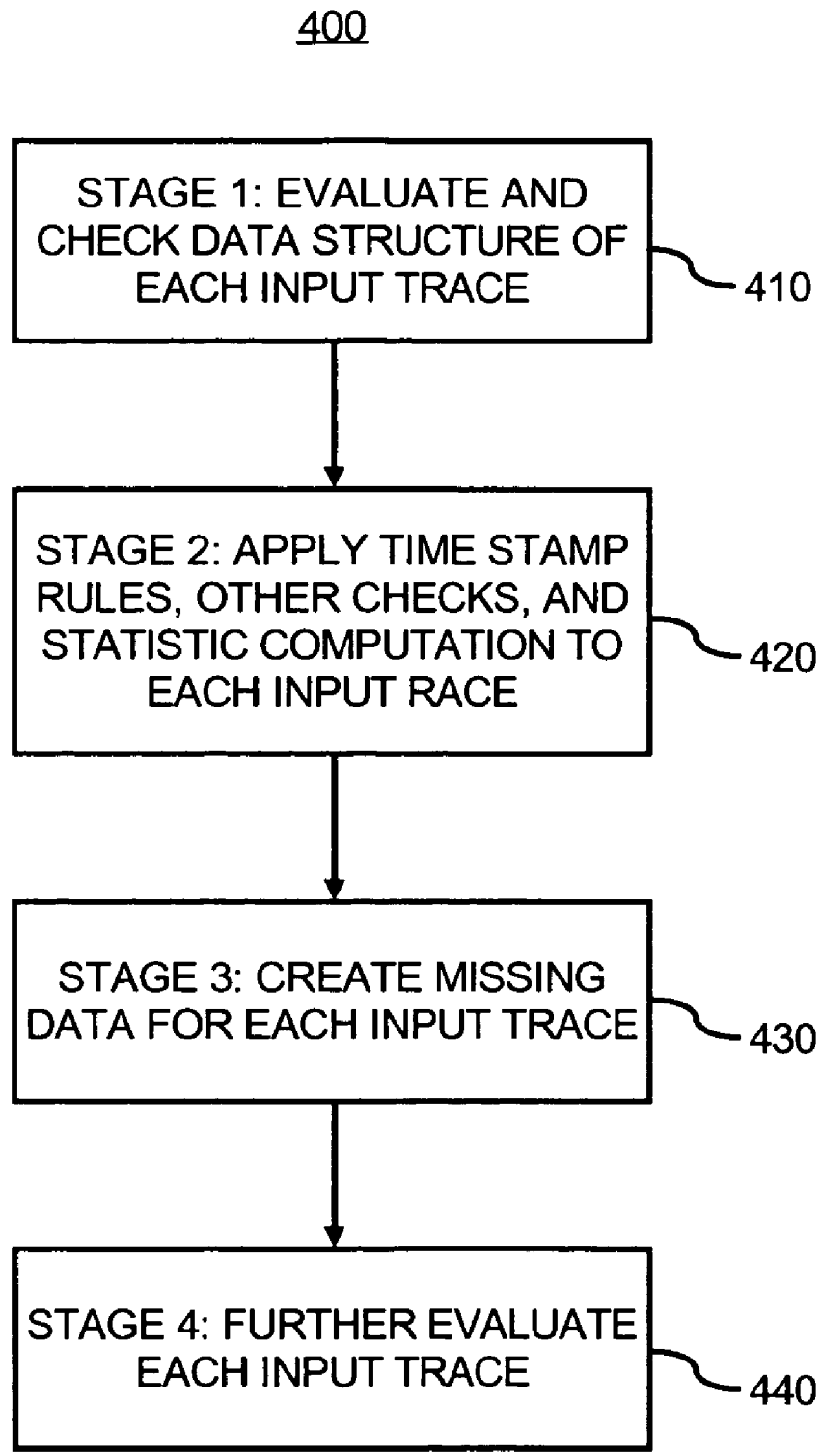
FIG. 4 illustrates a process flow for data assurance rules, in accordance with one embodiment.

As shown in FIG. 4, the data assurance rules are organized into four stages. At Stage 1, 410, the data structure of each input trace is evaluated and checked before any data rows therein are examined. At Stage 2, 420, predetermined time stamp rules, other checks, and statistics computation are applied to each input trace that comes out of Stage 1. At Stage 3, 430, data is created or generated to fill in any missing data rows of each input trace that comes out of Stage 2. At Stage 4, 440, the data quality of each input trace that comes out of Stage 3 is further evaluated. Each of the Stages 1-4 are further described below, with references to additional figures in the present application. Stages 1-4 can be performed in succession (for example, to reduce the required computational power) or concurrently (for example, to improve efficiency by reducing time required to perform data assurance).

Figure 5:
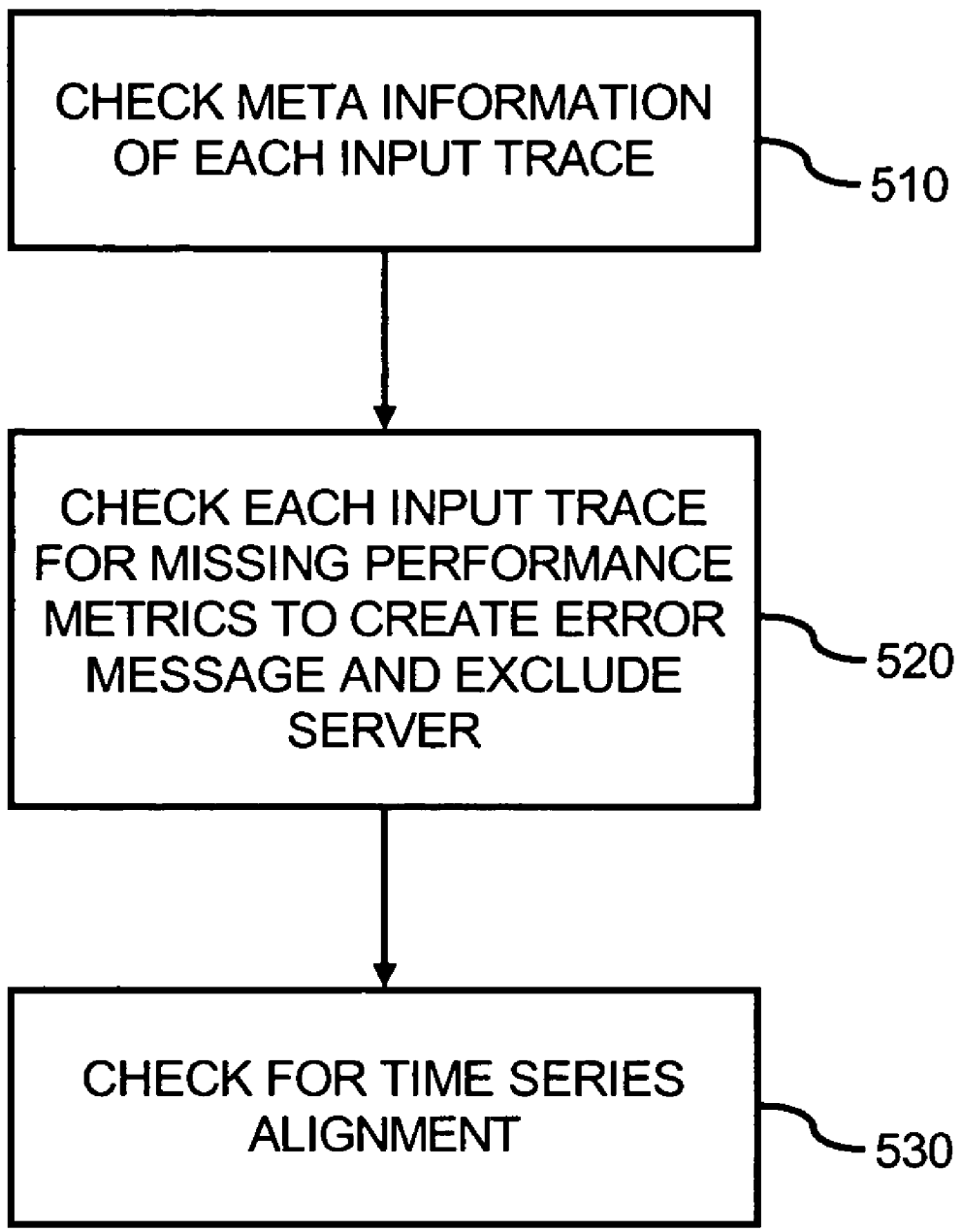
FIG. 5 illustrates Stage 1 of the process flow depicted in FIG. 4, in accordance with one embodiment.

FIG. 5 illustrates a process flow 500 that provides further details of Stage 1 shown in FIG. 4, in accordance with one embodiment. At 510, the metadata or meta information of each input trace is checked or verified to ensure that there are no unexpected problems. For example, a check is made to ensure that a field, such as a time zone, is in a specified format and valid, and the descriptions of the performance metrics contained in the trace are valid descriptions. In other words, the meta information is checked to make sure that each input trace is structured correctly and includes specified types of data. At 520, each input trace is checked for missing performance metrics, for example, by checking the metadata in the raw performance data 112 to determine if all the required or desired metrics for use in server consolidation are listed therein and consequently their values are supposed to be found in each trace. A source server is excluded in the server consolidation analysis, that is, marked with "Unchanged", when its trace is missing at least one required performance metric. For each required performance metric that is missing data, an error message is created.

At 530, time series alignment is checked, wherein the time stamps of the first data row in the input trace (hereinafter, "InputTrace_BeginTime"), the last data row in the input trace (hereinafter, "InputTrace_EndTime"), the first data row in the expected output trace (hereinafter, "OutputTrace_BeginTime") of the DAM 120, and the last data row in the expected output trace (hereinafter, "OutputTrace_EndTime") of the DAM 120 are checked for the following conditions:

Time stamp offset=InputTrace_BeginTime_31 OutputTrace_BeginTime;

If InputTrace_BeginTime>OutputTrace_EndTime, or InputTrace_EndTime<OutputTrace_BeginTime, then create error message indicating no overlap and exclude server;

If Time stamp offset>0, then create an error message indicating missing data
  at the beginning;
If Time stamp offset<0, then create an informational message indicating extra
  data at the beginning.

Figure 6:
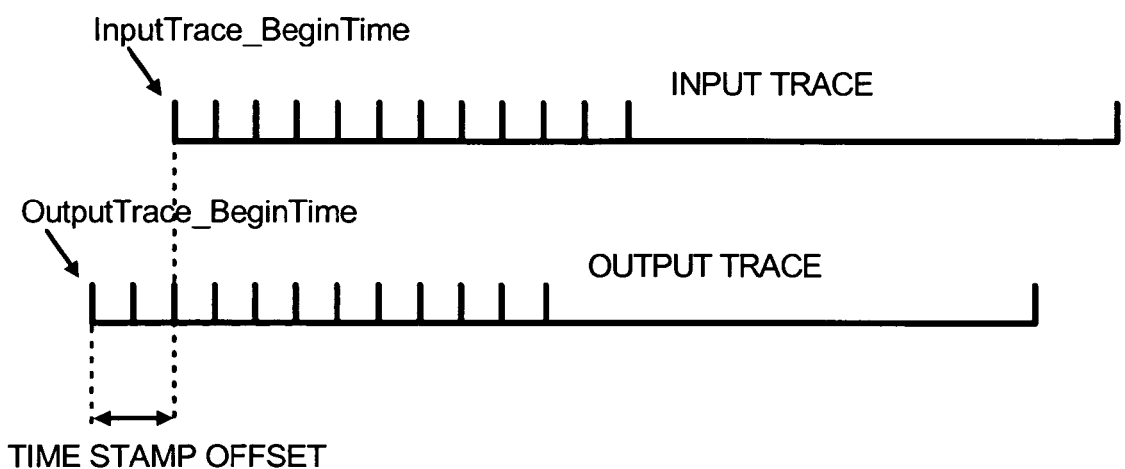
FIG. 6 illustrates an example of a time stamp offset, in accordance with one embodiment.

It should be noted that OutputTrace_BeginTime and OutputTrace_EndTime are based on the specified interval of time desired for the consolidation analysis. FIG. 6 illustrates an example wherein the InputTrace_BeginTime is later than the OutputTrace_BeginTime to generate a Time stamp offset.

Figure 7A:
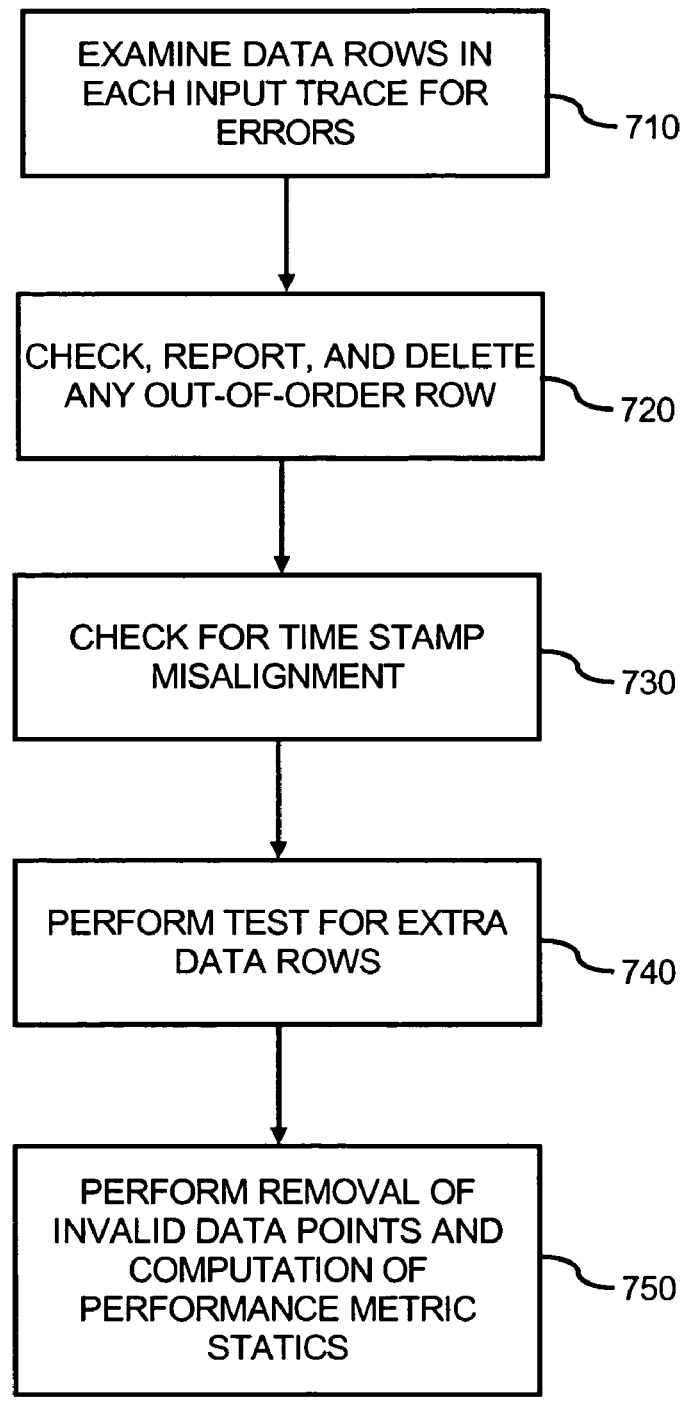
FIGS. 7A-B illustrate Stage 2 of the process flow depicted in FIG. 4, in accordance with one embodiment.

FIG. 7A illustrates further details of Stage 2 shown in FIG. 4, in accordance with one embodiment. The goal of this stage is to examine and process each input trace for a given server and to produce an intermediate version of the output trace. In one embodiment, Stage 2 is applied in a single pass through the data in the input trace. In an alternative embodiment, it is possible to apply components of Stage 2 separately to the data in the input trace. Accordingly, once the input traces are evaluated, checked, and passed in Stage 1, Stage 2 is commenced to further examine the data rows within those passed input traces in Stage 1.

At 710, the data rows in each input trace are first examined for errors. If an error occurs when reading a data row, the examination of such data row is stopped, a fatal error is recorded, and the server from which the input trace originates is excluded. An example of this type of error is that there are too few fields in the current data row. In other words, a metric value is missing or there is no data for one or more required performance metric. The term "no data" herein refers to a lack of any data value for the particular performance metric. Thus, a performance metric has a data value even when such data value is NULL or zero.

At 720, the DAM 120 examines the data rows (i.e., each time $T_i$) in each input trace to check, report, and delete those rows that are out of order. In one embodiment, the time stamp of each data row is checked to see if it is less than the time stamp of an adjacent previous data row. If the time stamp of a current data row is indeed less than the time stamp of an adjacent previous data row, the current row is deemed to be out of order. An informational message is then generated to report the current row as being out of order, and the row is deleted. Otherwise, no reporting or row deletion is performed.

Next, at 730, time stamp misalignment is checked, wherein the time stamps for the data rows in each input trace are checked against those time stamps defined by the predetermined time base in the expected output trace. In one embodiment, if multiple data collectors are used in the data collection module 110, there is agreement among the multiple data collectors about the time to assign to the time stamps, that is, mod(time-stamp-for-first-data-row, Sampling Interval) is constant for all data collectors, and the Sampling Interval is the same as the expected Trace_DataRowInterval, the following calculations are made at each time stamp of each data row in each input trace:

$$\Delta = |\text{actual time stamp} - \text{expected time stamp in the output trace}|;$$

If $\Delta \leq k \times \text{Trace\_DataRowInterval}$, where k is a predetermined acceptable difference multiplier for time stamp alignment, then change the actual time stamp to the expected time stamp;
  Otherwise, reject the data row, report alignment error, and
    add one to the count
      the number of alignment errors (or rejected data rows),
      and an entry in
        the error log is added to indicate this particular occurence.

Figure 8:
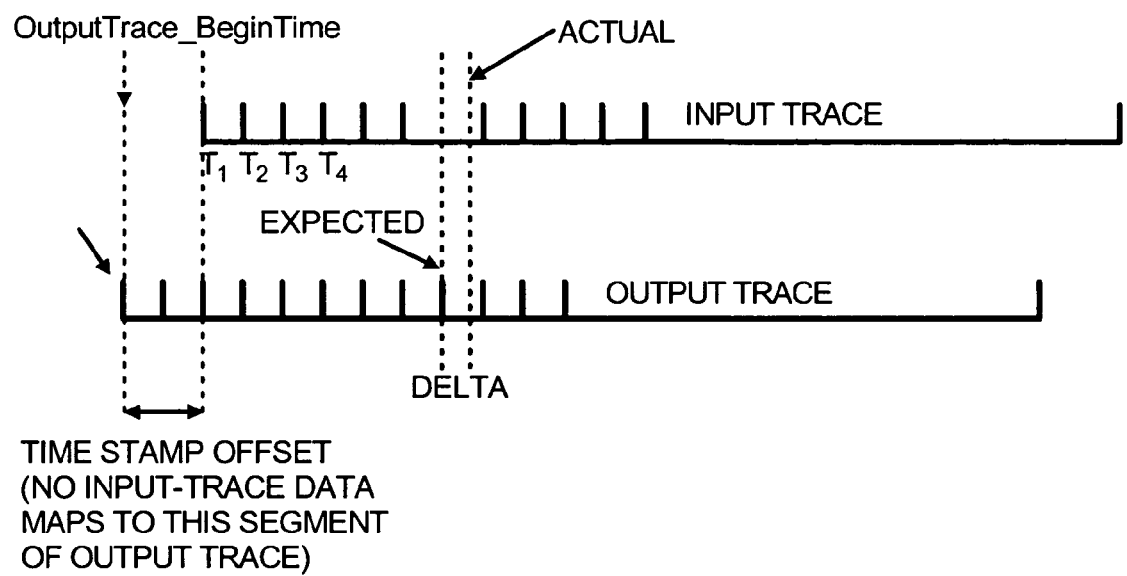
FIG. 8 illustrates an example of a time difference between an actual time stamp in an input trace and a time stamp in an expected output trace, in accordance with one embodiment.

FIG. 8 illustrates an example of a $\Delta$ value to show a possible discrepancy between an input trace and the expected output trace.

In another embodiment, when there is no agreement among the multiple data collectors about the time to assign the time stamps, that is, the time-stamp-for-first-data-rows are different for at least some of the data collectors, but with the Sampling Interval for all data collectors matching with the Trace_DataRowInterval, the DAM 120 is to: (a) align and rewrite the actual time stamps of each input trace to the time base of the expected output trace; or (b) construct a new input trace by resampling the old input trace. To align and rewrite the actual time stamps, each of such time stamps is rewritten to the nearest time stamp in the expected time series of the output trace. The rewriting is operable to position a data row earlier in time than is indicated by its actual (original) time stamp, as shown, for example, in row 5 of Table 1.

TABLE 1

| Table Row | Time stamps in the input trace | Time stamps in the expected output trace | Comments |
| --- | --- | --- | --- |
| 1 | | 11:00 | There is no data in the input trace to map to this interval in the output trace |
| 2 | 11:33 | 11:35 | Data row 1 in the input trace |
| 3 | 11:38 | 11:40 | Data row 2 |
| 4 | 11:43 | 11:45 | Data row 3 |
| 5 | 11:46 | 11:45 | This data row in the input trace is to be marked as an "extra row" because data row 3 was mapped to the same time stamp |
| 6 | | 11:50 | No data in the input trace is mapped to this interval in the output trace |
| 7 | 11:54 | 11:55 | Data row 5 |
| 8 | 11:58 | 12:00 | Data row 6 |
| 9 | 12:03 | 12:05 | Data row 7 |

Figure 9:
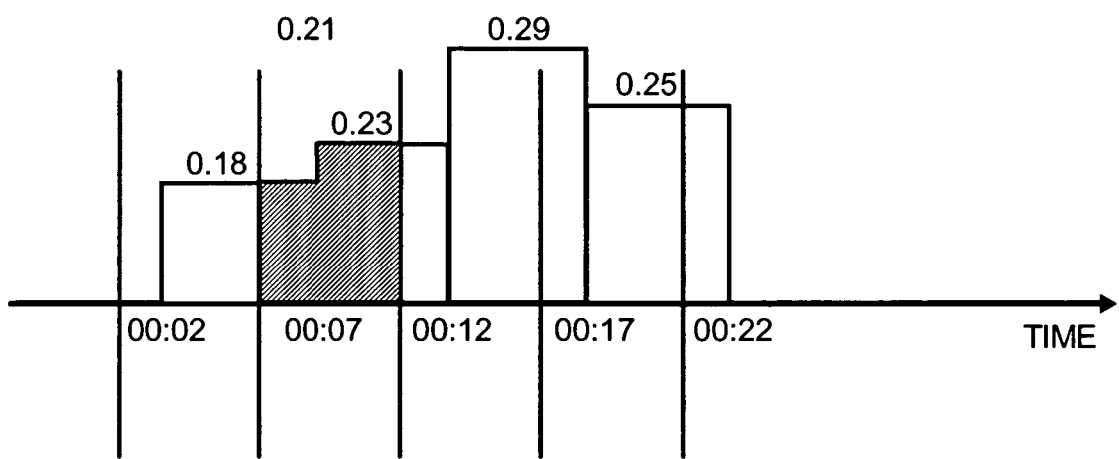
FIG. 9 illustrates an example of CPU utilization, in accordance with one embodiment.

To illustrate the resampling of an old input trace to construct a new input trace, consider the following example involving CPU utilization. Let's assume that the reported value of CPU utilization is uniform throughout the measurement interval. Specifically, if CPU utilization is 18% during the interval [2004-10-01 00:02 GMT, 2004-10-01 00:07 GMT], then the CPU utilization is 18% during any minute, any second, and any sub-interval, of that 5-minute interval. Also, graphically, let's assume the CPU utilization from a server is as illustrated in FIG. 9. Given the above CPU utilization with CPU utilization uniformly at 0.18 over [00:02, 00:07] and uniformly at 0.23 over [00:07, 00:12], the average utilization between 00:005 and 00:10 is:

$$0.18*(00:07-0:05)/(00:10-00:05)+0.23*(00:10-00:07)/(00:10-00:05)=0.18*0.4+0.23*0.6=0.21.$$

In other words, the new value for CPU utilization over the new interval that matches with an interval of the expected output trace is an "interpolated" value (or weighted sum) of the two previous values. With this resampling approach, it is possible to re-compute all the CPU utilization numbers over any given intervals. Furthermore, it is mathematically consistent with the way the original data points (0.18 and 0.23) are reported, that is, they are weighted averages of CPU utilizations over finer time intervals, such as 1 millisecond. In an alternate embodiment, instead of taking the weighted sum of the two original data points 0.18 and 0.23, it is possible to take the maximum of the two original data points 0.18 and 0.23 if the nature of the data series is of a "maximum" type, such as maximum memory used during the 5-minute interval.

In still another embodiment, when there is agreement among the multiple data collectors about the time to assign the time stamps, but the Sampling Interval for an input trace is not the same as the expected Trace_DataRowInterval, the aforementioned resampling scheme is used to construct a new input trace. Alternatively, the time stamps are rewritten as also aforementioned, trading implementation simplicity for a potential reduction in accuracy.

Figure 7B:
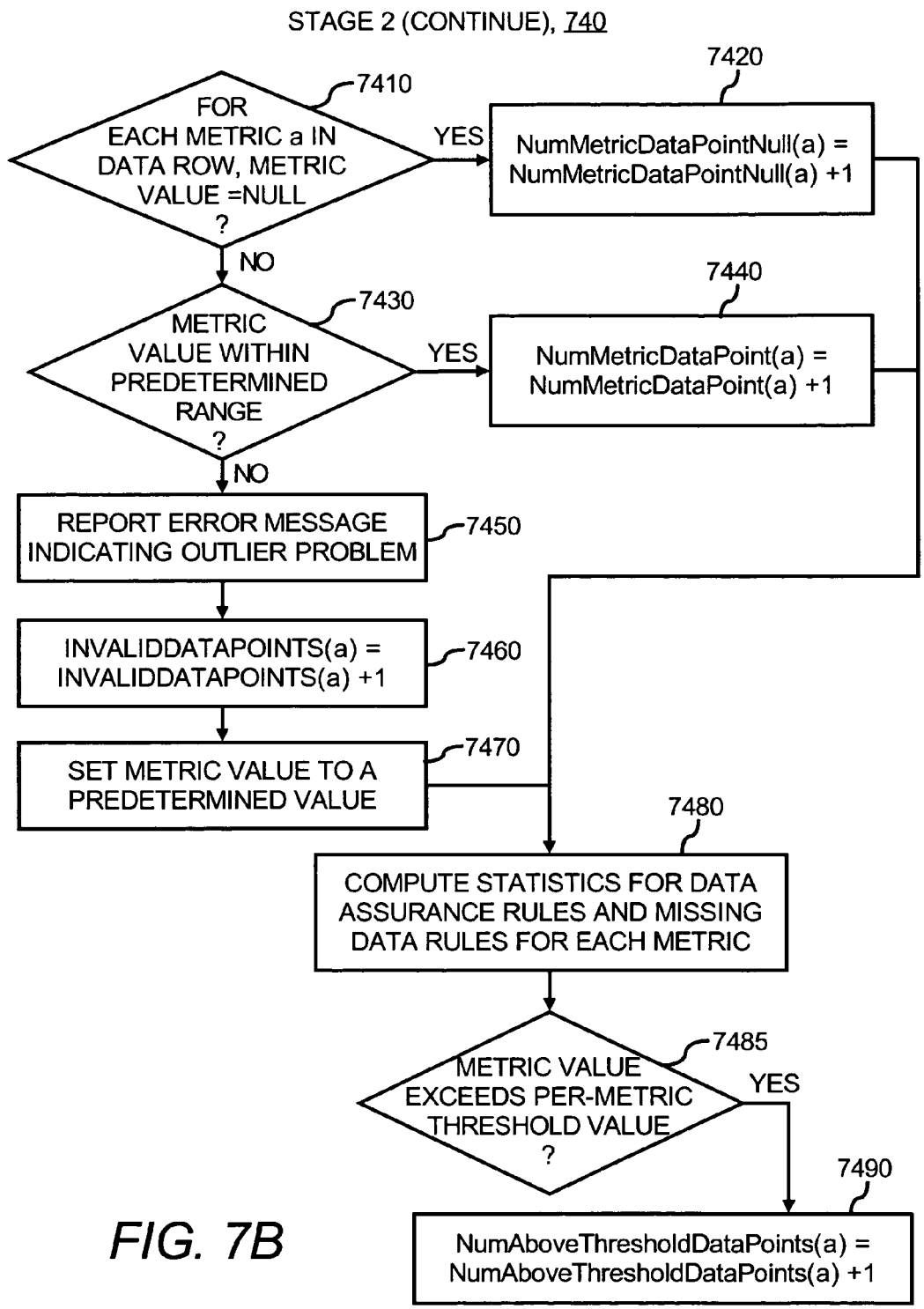

Referring back to FIG. 7A, at 740, once the time stamp misalignment is checked, the DAM 120 performs a test for any extra data rows in an input trace using the aligned time stamps that are output from 730 above. The algorithm for the extra-data-row test is described in Table 2 with examples from Table 1 to further elaborate its operation.

afterwards because such removal potentially affects some of the statistics. The removal of invalid data points and computation of performance metric statistics are now described with reference to FIG. 7B. The DAM 120 checks for invalid data points by comparing the actual value of a performance metric to the expected minimum and maximum values, as found in the metadata included in the raw performance data 112, for the performance metric. Thus, for each performance metric a at each time interval t, the DAM 120 computes a summation used to evaluate whether a performance metric a is missing from an input trace. The summation assigns a value of 1 for each data row that the performance metric a has a NULL value sums up the number of 1's to generate a value called NumMetricDataPointNull(a). This value is compiled incrementally, one data row at a time. Likewise, the summation assigns a value of 1 for each data row that the performance metric a has a value other than a Null value and sums up the number of 1's to generate a value called NumMetricDataPoint(a). In one embodiment, the Null value is represented by some predetermined character, indicator, or value

TABLE 2

| Extra Data Row Test | Examples |
|---|---|
| Calculate the time difference, Δt, between a current data row and a previous one. | Let's use Row 5 (marked as "extra row") in Table 1 as the current row. Then Row 4 is the previous row. |
| If Δt ≦ 0,<br>a. do not include extra data row; | Because both Rows 4 and 5 have the same time stamp of 11:45 in the expected output trace, Δt = 0. Thus, Row 5 is marked as "extra row" and not included in the input trace. |
| b. consecutive extra rows = consecutive extra rows + 1; | Row 5 = $1^{st}$ consecutive extra row; thus, if Row 6 was also mapped to the expected output time of 11:45 or less, then Row 6 = $2^{nd}$ consecutive extra row; and so on. |
| 1) for consecutive extra rows > ExtraRows_ConsecutiveRowsThreshold | Consecutive extra rows = 1, because only Row 5 is a consecutive extra row. This number is compared with a predefined threshold (ExtraRows_ConsecutiveRows Threshold), for generating an error. |
| i. create error message;<br>ii. Extra Row = Extra Row + 1;<br>iii. reset consecutive extra row to 0;<br>iv. go to next row; | Count the number of times a group of extra rows (which is greater than the predefined threshold) is encountered by resetting the consecutive extra row to 0 for each group; in Table 1, Row 6 does not have same time stamp of 11:45 as in Row 5, so Row 6 is not considered an extra, and the algorithm ends up in 2) below. |
| 2) for consecutive extra rows ≦ ExtraRows_ConsecutiveRowsThreshold,<br>i. consecutive extra rows = 0;<br>ii. go to next row. | Reset consecutive extra rows to 0 when it is less than the predefined threshold, and go to next row and repeat the algorithm. |

Wherein, ExtraRows_ConsecutiveRowsThreshold is the predefined threshold, set as desired by the user, indicating the number of consecutive data rows that must be extra or out of order before a data problem is generated. In effect, an error is generated when there is a group of (N+1) data rows that all have the same time stamps or are out of order, where N=ExtraRows_ConsecutiveRowsThreshold.

Referring back to FIG. 7A, at 750, once the extra data row test is performed, the DAM 120 next performs a removal of invalid data points and computation of statistics used in step 440 to evaluate the quality of the data trace. In one embodiment, some of the evaluation statistics are computed prior to the removal of invalid data points, while others are computed other than a zero. Accordingly, the NumMetricDataPointNull and NumMetricDataPoint values are computed for each metric as follows.

At 7410, the DAM 120 determines, for each performance metric a in each data row of an input trace, whether such a metric exhibits the predetermined NULL value, for example, zero. If yes, at 7420, the NumMetricDataPointNull(a) value for the particular metric is increased by 1, that is, NumMetricDataPointNull(a)=NumMetricDataPointNull(a)+1.

If no, at 7430, the DAM 120 determines whether the metric value is an invalid data point by checking whether the metric value falls outside of the predetermined range for the metric, that is, whether the metric value is within the expected minimum and maximum values for the performance metric as mentioned earlier. At 7440, if the metric value is within the predetermined range, the NumMetricDataPoint(a) value is increased by 1, that is, NumMetricDataPoint(*a*)=NumMetricDataPoint(*a*)+1.

However, at 7450, if the metric value is outside the predetermined range, the DAM 120 reports an error message indicating the outlier problem (including information about the server, time stamp, metric, actual value, comparison value, <min, or >max): At 7460, the DAM 120 increments a value called invalidDataPoints(a) by 1, that is, invalidDataPoints(*a*)=invalidDataPoints(*a*)+1, to count up the number of invalid data points for each metric. In one embodiment, at 7470, if the metric value is less than the minimum value predetermined for the metric, the actual value is set to the minimum value. Likewise, if the metric value is greater than the maximum value predetermined for the metric, the actual value is set to the maximum value. Thus, 7410-7460 describe a detection scheme and 7470 describes a correction scheme. Alternative embodiments are contemplated, however, wherein for the correction scheme in 7470 any actual metric value outside the predetermined range is set to a predetermined value, such as zero.

At 7480, the DAM 120 computes the statistics for data assurance rules for each metric by gathering the summation of each of the NumMetricDataPoint(a) values, NumMetricDataPointNull(a) values, and invalidDataPoints(a), and increments a value called Histogram(a, metric value) by:

Histogram(*a*, metric value)=Histogram(*a*, metric value)+1, for each performance metric a for all data rows that were output by the earlier test at 740. A histogram in essence counts the number of times a given metric value appears in the trace (e.g., how many times the value of the metric XYZ equals to 5). A histogram can be constructed using a data structure that has N buckets. A range of values is then assigned to each bucket, e.g., if the min-max values are 0-100 and N=10, values 0-9 are assigned to one bucket, 10-19 to the second, and so on. Each monitored data value of a performance metric a is mapped to a corresponding bucket, and the count stored in the bucket is incremented by one each time. When this process is completed, a histogram of the values is generated. In the next stage, Stage 4, as further described below, the DAM 120 uses the "most common value" to fill in for missing values. The most common value maps to the bucket with the greatest count. One way to define the value itself is to take the beginning value of the bucket, e.g., say, 10 in the example.

Referring back to Stage 3 in FIG. 7B, at 7485, the DAM 120 further determines whether the value for each metric exceeds a predetermined per-metric Threshold value, as specified by the user. If yes, at 7490, the DAM 120 increments another value, NumAboveThresholdDataPoints(a) by 1, that is:

NumAboveThresholdDataPoints(*a*)=NumAboveThresholdDataPoints(*a*)+1, for inclusion in the computed statistics. At this juncture, the DAM 120 is not testing for an error condition, but is rather testing to see if there may be pent-up demand which cannot be correctly measured by the metric. For example, consider CPU utilization, which is typically expressed as a percentage between 0 and 100%. If a particular CPU utilization value is 100%, there is no knowledge of whether the application running on the system could have used more CPU resources if a more powerful CPU was in the system. In one embodiment, a key premise of the server consolidation is that the past behavior of a workload is an indication of its future behavior on a more powerful system. Hence, a monitored high metric value could be an indication that the input data does not provide an accurate reflection of the past behavior. Hence, the user should be made aware of the above per-metric threshold problems. If a sufficient number of those problems occur, the DAM 120 can recommend that the server not be included, as further described in Stage 4 below.

Figure 10:
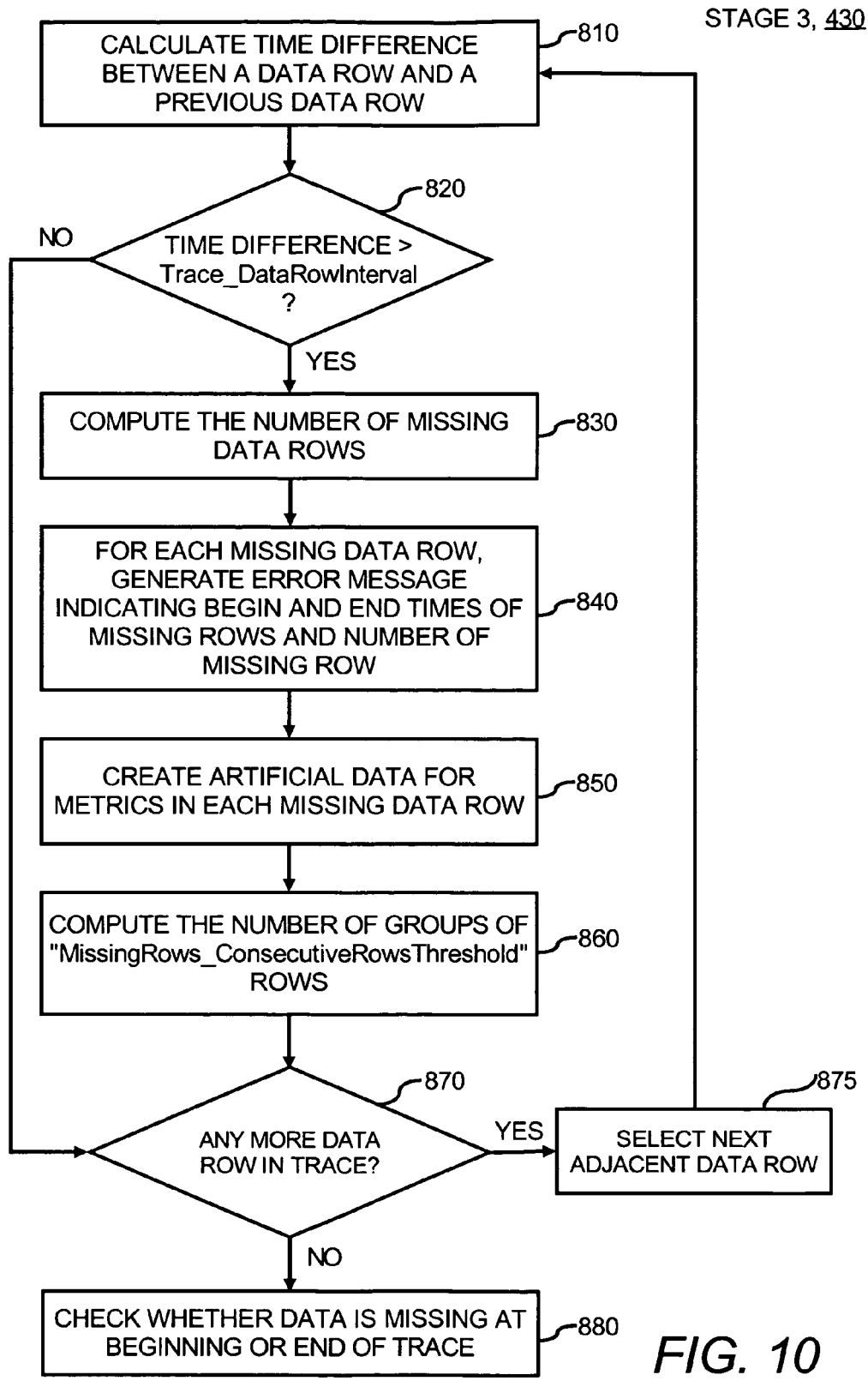
FIG. 10 illustrates Stage 3 of the process flow depicted in FIG. 4, in accordance with one embodiment.

Referring back to FIG. 4, once each data row in an input trace is generated by Stage 2 (420), the DAM 120 initiates Stage 3 at 430 to fill missing data in the input trace. FIG. 10 illustrates further details of Stage 3 as described below.

First, at 810, the DAM 120 calculates a time difference between each data row and a previous one in the input trace, starting with the second data row in a trace. Stage 3 uses the output generated by Stage 2, and assumes that the time stamps of successive rows monotonically increase.

At 820, the DAM 120 determines whether the calculated time difference is greater than Trace_DataRowInterval. If no, the DAM 120 proceeds to 870 for another data row in the trace, as described later.

At 830, if the time difference is greater than Trace_DataRowInterval, the DAM 120 proceeds to determine the number of missing data rows with the following computation, Number of missing data rows=(time difference/Trace_DataRowInterval)−1.

At 840, the DAM 120 generates an error message indicating the begin and end times of the missing rows and the number of missing rows.

At 850, the DAM 120 proceeds to create artificial data for the metrics in each missing row in accordance with one of many possible embodiments. For example, in one embodiment, the DAM 120 determines whether the time difference is also less than a predetermined value called MissingDataInterval_InterpolateThreshold? If it is, the DAM 120 applies linear interpolation to create the metrics in the missing row, using as the start and end points the metric value of the previous existing data row and the current data row. The reason for this threshold is that some techniques are to be used only in certain situations. For example, if there are two missing observations (5 minute), linear interpolation is one possible technique. However, if one day of data is missing, linear interpolation may not be a good technique. In another embodiment, if the time difference is greater than or equal to the predetermined MissingDataInterval_InterpolateThreshold, the DAM 120 uses the most popular value, that is, the statistical mode value, which is a "bucket" in the "Histogram of data values (a)", as described earlier, that contains the greatest count. If the bucket corresponds to more than one value, then, for example, the mid-point value is used.

At 860, The DAM 120 further counts up the number of groups of "MissingRows_ConsecutiveRowsThreshold" rows that are missing with the following computation:

Missing Rows=Missing Rows+("number of missing data rows"/Missing Rows_ConsecutiveRowsThreshold).

The MissingRows_ConsecutiveRowsThreshold is a threshold value used to determine the number of consecutive data rows that must be missing before a data problem is considered to exist and a warning or error message is generated, and it is computed as a product of a predetermined constant and the expected number of rows in the output trace, or:

MissingRows_ConsecutiveRowsThreshold=Missing Rows_ConsecutiveRowsThreshMultiplier×Trace_ExpectedNumOfRows.

For example, MissingRows_ConsecutiveRowsThreshold could be set to 1% of the expected number of rows. Thus, an error message is generated if more than this number of rows are missing in succession. For example, if the threshold is 10 and there is gap where 3 rows are missing, an error message is not generated. However, if 13 consecutive rows are missing, an error message is generated. The conditional determination for the aforementioned Missing Rows is further described with reference to Stage 4, FIG. 11B, later.

As shown at 870 and 875, the process from 810 through 860 is iterated for each data row until there is no data row left in the trace, at which point, the DAM 120 proceeds to 880. At 880, the DAM 120 also checks whether data is missing from the beginning or the end of the trace. To check whether data is missing from the beginning of an input trace, the DAM 120 calculates a difference between the actual begin time of an input trace and the expected begin time of the output trace, that is, D_begin=InputTrace_BeginTime−OutputTrace_BeginTime.

If D_begin>0, the DAM 120 proceeds to:

a) generate an error message indicating the actual begin and expected begin time, and the number of missing rows;

b) compute the number of missing data rows=D_begin/Trace_DataRowInterval; and c) count how many groups of "MissingRows_ConsecutiveRowsThreshold" rows are missing with the aforementioned computation, Missing Rows=Missing Rows+("number of missing data rows"/MissingRows_ConsecutiveRowsThreshold); and d) create artificial values by using most popular value, as described earlier.

To check whether data is missing from the end of an input trace, the DAM 120 calculates a difference between the actual end time of an input trace and the expected end time of the output trace, that is, D_end=InputTrace_EndTime−OutputTrace_EndTime.

If D_end<0, the DAM 120 proceeds to:

a) generate an error message indicating the actual end and expected end times, and the number of missing rows; and b) repeat b-d described above for the determination of missing data at the beginning of the trace.

Referring back to FIG. 4, once missing data is created in Stage 3, the DAM 120 proceeds with Stage 4, which further evaluates the data quality of the trace produced in Stage 2 (with created data from Stage 3). Stage 4 is executed once for each server. In one embodiment, data quality evaluation in Stage 4 includes a number of separate rules, as illustrated in FIGS. 11A-E and described below.

Figure 11A:
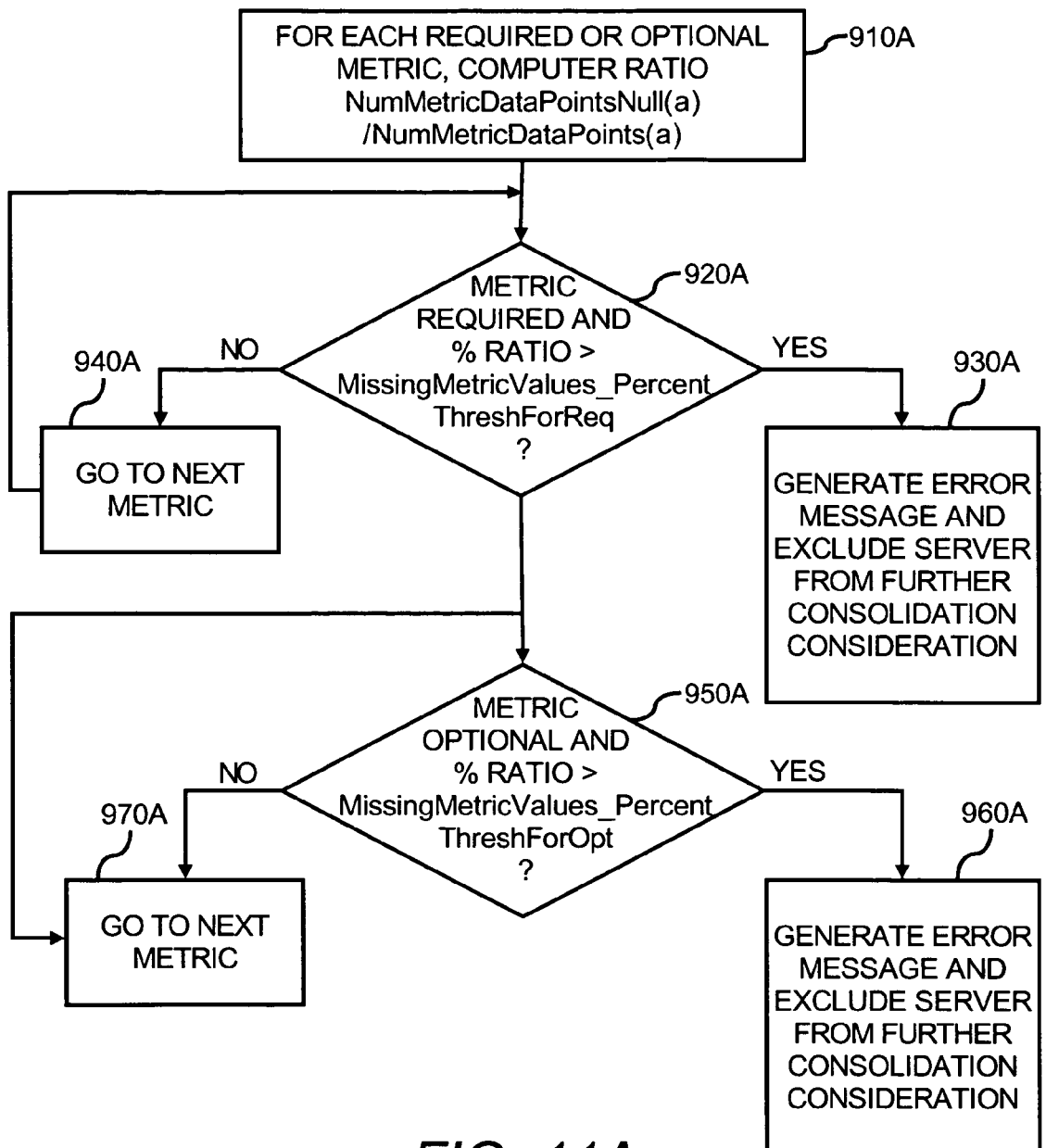
FIGS. 11A-E illustrates Stage 4 of the process flow depicted in FIG. 4, in accordance with one embodiment.

FIG. 11A illustrates the first rule in Stage 4 for evaluating missing metrics. At 910A, for each required metric or optional metric, the DAM 120 computes the ratio (as a percentage) of NumMetricDataPointsNull(a) to NumMetricDataPoints(a), that is, % Ratio=NumMetricDataPointsNull(a)/NumMetricDataPoints(a)×100.

As referred herein, required metrics are those metrics without which server consolidation cannot be performed. Whereas, optional metrics are those metrics not required for server consolidation, but with which server consolidation can be further improved. The required metrics include, for example, CPU utilization & Memory residency, while the optional ones include CPU queue, paging, disk busy, disk queue, network bytes.

At 920A, the DAM 120 determines whether the metric is required and the % Ratio is greater than the predetermined value, MissingMetricValues_PercentThreshForReq. In other words, if more than a given percentage of the metric values of a source server are missing for a required metric, such a server is not to be included in a consolidation scenario. A different threshold value is used for the required and optional metrics. If yes, at 930A, the DAM 120 generates an error message detailing the finding and excludes the server, that is, marking the server as "Unchanged." If no, at 940A, the DAM 120 proceeds to the next metric and makes the same determination.

At 950A, the DAM 120 determines whether the metric optional, and the % Ratio is greater than the predetermined value, MissingMetricValues_PercentThreshForOpt? (threshold value for the optional metrics). If yes, at 960A, the DAM 120 again generates an error message detailing the finding but now recommends to the user to exclude the server, that is, marking the server as "Unchanged." If no, at 970A, the DAM 120 proceeds to the next metric and makes the same determination.

Figure 11B:
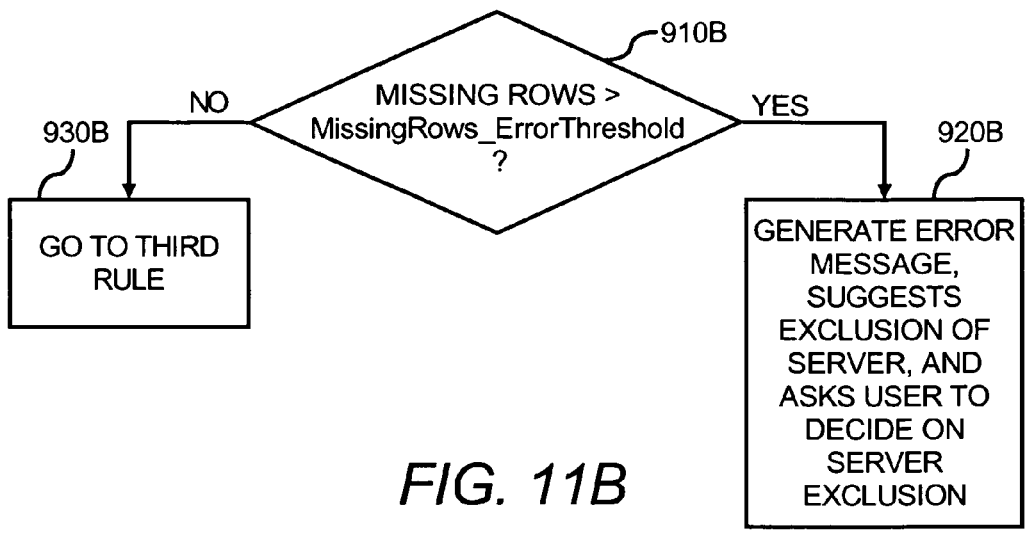

Once the first rule of Stage 4 is completed, the DAM 120 proceeds to the second rule, as illustrated in FIG. 11B, for evaluating missing rows. At 910B, the DAM 120 determines whether the missing rows (as calculated at 860 in FIG. 10) are greater than a predetermined MissingRows_ErrorThreshold. If yes, at 920B, the DAM 120 generates an error message with the number of missing rows, suggests to the user to exclude the server, and asks the user to decide on server exclusion. If no, at 930B, the DAM 120 proceeds to the Third Rule.

Figure 11C:
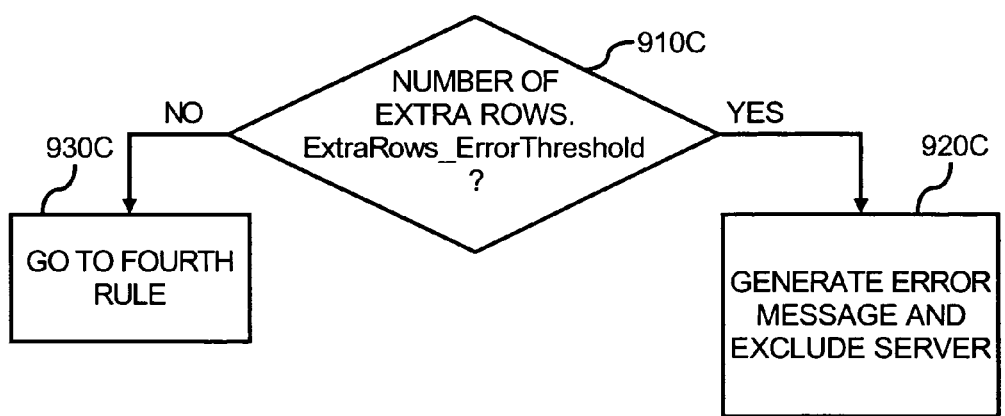

FIG. 11C illustrates the third rule of Stage 4. At 910C, the DAM 120 determines whether the number of Extra Rows (as calculated in FIG. 7B) is greater than the predetermined value, ExtraRows_ErrorThreshold. If yes, at 920C, the DAM 120 generates an error message and excludes the server (that is, marked as Unchanged), and the user cannot override this action. If no, at 930C, the DAM 120 proceeds to the fourth Rule.

Figure 11D:
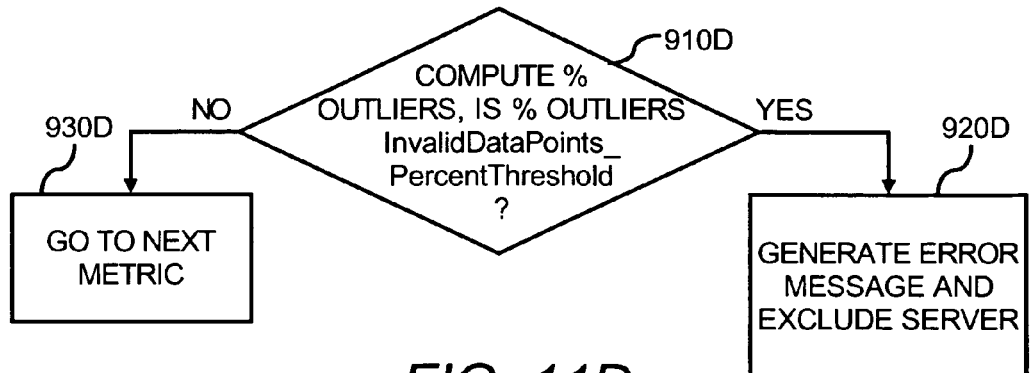

FIG. 11D illustrates the fourth rule of Stage 4, which is a test for invalid data points for each metric. At 910D, the DAM 120 determines the percentage of outliers with the following computation:

100×invalidDataPoints(a)/NumMetricDataPoints(a), and also determines whether the % of outliers is greater than the predetermined value, InvalidDataPoints_PercentThreshold. If yes, at 920D, the DAM 120 generates an error message and excludes the server, and the user cannot override this action. If no, at 930D, the DAM 120 continues with the next metric until all of the metrics are evaluated by this rule before proceeding with the fifth rule of Stage 4.

Figure 11E:
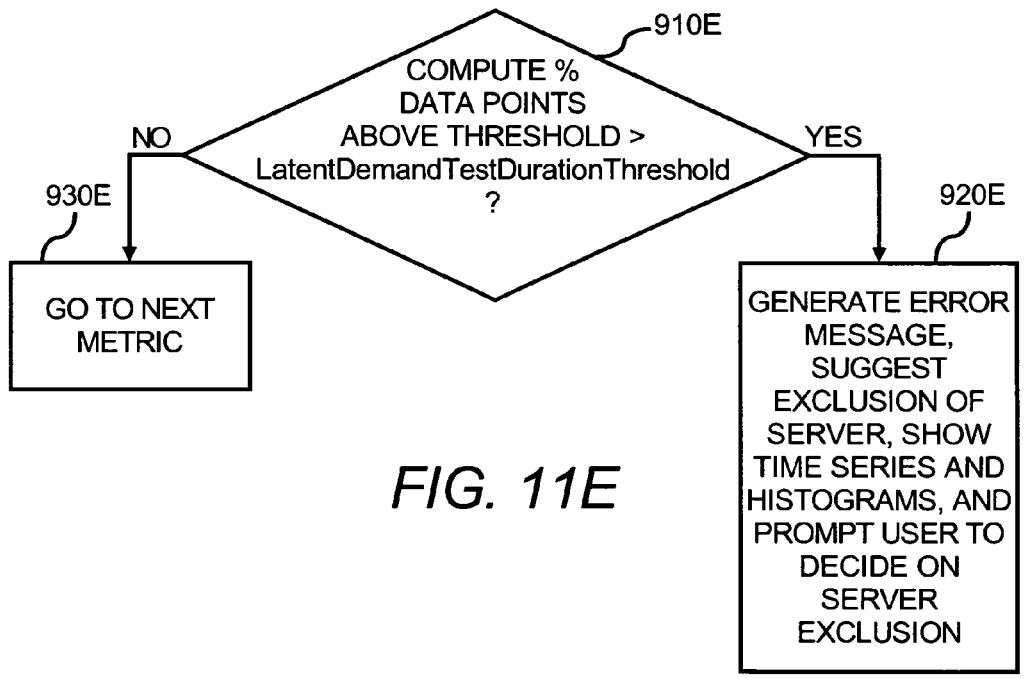

FIG. 11E illustrates the fifth rule of Stage 4, wherein the DAM 120 checks for latent demand. For each metric, at 910E, the DAM 120 computes the percentage of data points over a predetermined threshold, that is, 100×NumAboveThresholdDataPoints(a)/NumMetricDataPoints(a), and determines whether such a percentage is greater than a predetermined percentage value, LatentDemandTestDurationThreshold. If yes, at 920E, the DAM 120 creates an error message indicating the latent demand, suggests the user to exclude the server, shows the time series (plot actual values only using change value approach), shows histogram (create bands and show number of actual data points and % distribution), and ask the user to decide on the server exclusion. If no, at 930E, the DAM 120 continues with the next metric until metrics are evaluated by this rule.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for data assurance in server consolidation, comprising:
   collecting performance data of a plurality of source servers in a desired environment that are selected for server consolidation, the performance data includes an input trace of each of the plurality of source servers, the input trace includes data of a plurality of performance metrics collected over a predetermined period of time at predetermined time intervals for the each performance metric;
   evaluating and checking a data structure of the input traces of the collected performance data, wherein the checking includes checking for missing data in the data structure of the input traces;
   applying with a computerized system predetermined time stamps, predetermined checks, and predetermined statistic computations to each of the input traces;
   generating, based on results of applying predetermined time stamps, predetermined checks, and predetermined statistic computations, data to fill in the missing data of at least one of the input traces; and
   evaluating a data quality of the input traces based on the generated data.

2. The computer-implemented method of claim 1, wherein evaluating and checking the data structure comprises:
   checking meta information of the input traces to ensure correct types of data;
   checking the input traces to exclude any one of the plurality of servers that has an associated one of the input traces with at least one missing performance metric from the plurality of performance metrics; and
   checking a time series alignment of the input traces by comparing a begin time and an end time of the input traces with a predetermined begin time and a predetermined end time of an expected output trace.

3. The method of claim 1, wherein applying with a computerized system comprises:
   examining the plurality of performance metrics in each of the predetermined time intervals in each of the input traces for predetermined errors;
   for each of the input traces, removing any of the plurality of predetermined time intervals, and the plurality of performance metrics therein, from the each input trace when the any predetermined time interval is out of order with respect to an adjacent previous time interval in the plurality of predetermined time intervals;
   checking a time stamp misalignment of each of the input traces by comparing time stamps for the predetermined time intervals in the each input trace with predetermined time stamps in an expected output trace;
   determining whether the each input trace includes data for the plurality of performance metrics in an extra time interval having a time stamp not accounted by the predetermined time stamps in the expected output trace; and
   performing with the computerized system removal of invalid data points and computation of statistics of each of the performance metrics in the each input trace, wherein each of the data points in the input trace represents a data value of one of the plurality of performance metrics at one of the predetermined time intervals in the each input trace.

4. The method of claim 3, wherein performing with the computerized system removal of invalid data points and computation of statistics comprises:
   determining a number of NULL values for each of the plurality of performance metrics in each of the input traces;
   determining a number of data points for each of the plurality of performance metrics in the each input trace that are valid because the valid data points have values within a predetermined range;
   determining a number of data values for each of the plurality of performance metrics in the each input trace that are invalid because the invalid data points have values outside the predetermined range;
   for each of the invalid data points determined, generating an error message to report the each invalid data point; and
   for each of the invalid data points determined, assigning a predetermined value to the each data point.

5. The method of claim 4, wherein evaluating a data quality of the input traces comprises:
   calculating a ratio of the number of NULL values to the number of valid data points for the plurality of performance metrics in the at least one input trace;
   determining whether the calculated ratio is greater than a predetermined ratio value and the each performance metric is required; and
   upon a determination that the calculated ratio is greater than the predetermined ratio value and the each performance metric is required, generating an error message and marking the server from which the at least one input trace is collected with an Unchanged status.

6. The method of claim 4, wherein evaluating a data quality of the input traces comprises:
   calculating a ratio of the number of NULL values to the number of valid data points for the plurality of performance metrics in the at least one input trace;
   determining whether the calculated ratio is greater than a predetermined ratio value and the each performance metric is optional; and
   upon a determination that the calculated ratio is greater than the predetermined ratio value and the each performance metric is optional, generating an error message and recommending the server from which the at least one input trace is collected be marked with an Unchanged status.

7. The method of claim 4, wherein the step of evaluating a data quality of the input traces comprises:
   calculating a ratio of the number of invalid data points to the number of valid data points for the plurality of performance metrics in the each input trace;
   determining whether the calculated ratio is greater than predetermined ratio value;
   upon a determination that the calculated ratio is greater than the predetermined ratio value, generating an error message and marking a server from which the at least one input trace is collected with an Unchanged status.

8. The method of claim 4, wherein evaluating a data quality of the input traces comprises:
calculating a percentage of data points for the plurality of performance metrics in the at least one input trace that exceeds a predetermined value;
determining whether the calculated percentage is greater than a predetermined percentage value;
upon a determination that the calculated percentage is greater than the predetermined percentage value, generating an error message and requesting user input on whether a server from which the at least one input trace is collected is to be marked with an Unchanged status.

9. The method of claim 3, evaluating a data quality of the input traces comprises:
determining whether a number of extra rows obtained from the step of determining whether the at least one input trace includes data in the extra time interval is greater than a predetermined extra-rows-error threshold value; and
upon a determination that the number of extra rows is greater than the predetermined extra-rows-error threshold value, generating an error message and marking the server from which the at least one input trace is collected with an Unchanged status.

10. The method of claim 1,
wherein generating the data to fill in the missing data of at least one of the input traces includes,
a) calculating a time difference between two adjacent ones of the predetermined time intervals for the at least one of the input traces;
b) determining whether the time difference is greater than a predetermined time difference between time intervals in an expected output trace;
c) upon a determination that the time difference is greater than the predetermined time difference, calculating a number of the predetermined time intervals with missing data for the at least one input trace;
d) generating an error message indicating the number of the predetermined time intervals with missing data for the at least one input trace, a begin time for the number, and an end time for the number;
e) generating new data for the missing data for at least one of the performance metrics based on predetermined criteria;
f) calculating a missing-row number as a number of groups of consecutive ones of the predetermined time intervals with missing data for the at least one performance metric;
g) repeating a) to f) through a last one of the predetermined time intervals in the at least one input trace; and
h) checking whether there is missing data for the at least one performance metric at a beginning or an end of the at least one input trace.

11. The method of claim 10, wherein evaluating a data quality of the input traces comprises:
determining whether the missing-row number is greater than a predetermined missing-row threshold value;
upon a determination that the missing-row number is greater than the predetermined missing-row threshold value, generating an error message and recommending the server from which the at least one input trace is collected be marked with an Unchanged status.

12. A non-transitory computer-readable medium on which is encoded program code, the program code comprising:

program code for accessing performance data of a plurality of source servers, the performance data includes an input trace of each of the plurality of source servers, the input trace includes data of a plurality of predetermined performance metrics arranged as a plurality of data sets, each of the plurality of data sets includes accessed values of the plurality of performance metrics at a particular instance;
program code for evaluating a data structure of the input traces by checking metadata of the input traces to check for missing data in the predetermined performance metrics of the input traces;
program code for applying to each of the input traces one of: predetermined time stamps, predetermined checks, and predetermined statistical computations;
program code for generating, based on results of applying predetermined time stamps, predetermined checks, and predetermined statistic computations, data to fill in the missing data of at least one of the input traces; and
program code for evaluating a data quality of the input traces based on the generated data from running the program code for generating.

13. The computer readable medium of claim 12, wherein the program code for evaluating further comprises:
program code for excluding any one of the plurality of servers that has an associated one of the input traces with a missing one of the predetermined performance metrics; and
program code for checking a time series alignment of the input traces by comparing a begin time and an end time of the input traces with a predetermined begin time and a predetermined end time of an expected output trace.

14. The computer readable medium of claim 12, further comprising:
program code for concurrently processing the program code for evaluating the data structure of the input traces, the program code for applying to the input traces, the program code for generating the missing data of at least one of the input traces, and program code for evaluating the data quality of the input traces.

15. The computer readable medium of claim 12, wherein the program code for applying to each of the input traces comprises:
program code for examining the plurality of performance metrics in each of the predetermined time intervals in each of the input traces for predetermined errors;
program code for, for each of the input traces, removing any of the plurality of predetermined time intervals, and the plurality of performance metrics therein, from the each input trace when the any predetermined time interval is out of order with respect to an adjacent previous time interval in the plurality of predetermined time intervals;
program code for checking a time stamp misalignment of each of the input traces by comparing time stamps for the predetermined time intervals in the each input trace with predetermined time stamps in an expected output trace;
program code for determining whether the each input trace includes data for the plurality of performance metrics in an extra time interval having a time stamp not accounted by the predetermined time stamps in the expected output trace; and
program code for performing removal of invalid data points, based on expected minimum and maximum values as found in the metadata, wherein each of the data points in the input trace represents a data value of one of the plurality of performance metrics at one of the predetermined time intervals in the each input trace.

16. The computer readable medium of claim 12, wherein the program code for generating the data to fill in the missing data of at least one of the input traces comprises:
   a) program code for calculating a time difference between two adjacent ones of the predetermined time intervals for at least one of the input traces;
   b) program code for determining whether the time difference is greater than a predetermined time difference between time intervals in an expected output trace;
   c) program code for, upon a determination that the time difference is greater than the predetermined time difference, calculating a number of the predetermined time intervals with missing data for the at least one input trace;
   d) program code for generating an error message indicating the number of the predetermined time intervals with missing data for the at least one input trace, a begin time for the number, and an end time for the number;
   e) program code for generating new data for the missing data for at least one of the performance metrics based on predetermined criteria;
   f) program code for calculating a missing-row number as a number of groups of consecutive ones of the predetermined time intervals with missing data for the at least one of the performance metrics;
   g) program code for repeating program codes in a) through f) through a last one of the predetermined time intervals in the at least one input trace; and
   h) program code for checking whether there is missing data for the at least one performance metric at a beginning or an end of the at least one input trace.

17. A method for providing a server consolidation service to a customer, comprising:
   accessing performance data of a plurality of source servers in a desired environment, the performance data originating from the customer and including an input trace of each of the plurality of source servers, the input trace includes data of a plurality of predetermined performance metrics arranged as a plurality of data sets, each of the plurality of data sets includes accessed values of the plurality of performance metrics at a particular instance;
   assessing a quality of the performance data and cleaning the performance data;
   providing the cleaned performance data for server consolidation;
   wherein assessing the quality of the performance data and cleaning the performance data includes,
   evaluating a data structure of the input traces by checking metadata of the input traces to check for missing data in the predetermined performance metrics of the input traces;
   excluding at least one of the plurality of servers that has an associated one of the input traces with a missing one of the predetermined performance metrics;
   applying to each of the input traces one of: predetermined time stamps, predetermined checks, and predetermined statistical computations;
   generating, based on results of applying predetermined time stamps, predetermined checks, and predetermined statistic computations, data to fill in the missing data from at least one of the input traces;
   evaluating by a computer a data quality of the input traces with the generated data; and
   checking a time series alignment of at least one of the input traces by comparing a begin time and an end time of at least one of the input traces with a predetermined begin time and a predetermined end time of an expected output trace.

18. The method of claim 17, wherein applying to each of the input traces comprises:
   determining a number of NULL values for each of the plurality of performance metrics in each of the input traces;
   determining a number of data points for each of the plurality of performance metrics in the each input trace that are valid because the valid data points have values within a predetermined range;
   determining a number of data values for each of the plurality of performance metrics in the each input trace that are invalid because the invalid data points have values outside the predetermined range;
   for each of the invalid data points determined, generating an error message to report the each invalid data point; and
   for each of the invalid data points determined, assigning a predetermined value to the each data point.

19. The method of claim 18, wherein generating the data to fill in the missing data of at least one of the input traces comprises:
   a) calculating a time difference between two adjacent ones of the predetermined time intervals for at least one of the input traces;
   b) determining whether the time difference is greater than a predetermined time difference between time intervals in an expected output trace;
   c) upon a determination that the time difference is greater than the predetermined time difference, calculating a number of the predetermined time intervals with missing data for the at least one input trace;
   d) generating an error message indicating the number of the predetermined time intervals with missing data for the at least one input trace, a begin time for the number, and an end time for the number;
   e) generating new data for the missing data for at least one of the performance metrics based on predetermined criteria;
   f) calculating a missing-row number as a number of groups of consecutive ones of the predetermined time intervals with missing data for the at least one of the performance metrics;
   g) repeating a through f through a last one of the predetermined time intervals in the at least one input trace; and
   h) checking whether there is missing data for the at least one of the performance metrics at a beginning or an end of the at least one input trace.

20. The method of claim 19, wherein evaluating a data structure of the input traces comprises:
   calculating a ratio of the number of NULL values to the number of valid data points for each of the plurality of performance metrics in the at least one input trace;
   determining whether the calculated ratio is greater than a predetermined ratio value and the each performance metric is required; and
   upon a determination that the calculated ratio is greater than the predetermined ratio value and the each performance metric is required, generating an error message and marking the server from which the at least one input trace is collected with an Unchanged status.

* * * * *

UNITED STATES PATENT AND TRADEMARK OFFICE
CERTIFICATE OF CORRECTION

| | | |
|---|---|---|
| PATENT NO. | : 8,051,162 B2 | Page 1 of 1 |
| APPLICATION NO. | : 11/495365 | |
| DATED | : November 1, 2011 | |
| INVENTOR(S) | : Martin F. Arlitt et al. | |

It is certified that error appears in the above-identified patent and that said Letters Patent is hereby corrected as shown below:

In column 20, line 38, in Claim 14, delete "to the" and insert -- to each of the --, therefor.

Signed and Sealed this
Twenty-eighth Day of August, 2012

David J. Kappos
*Director of the United States Patent and Trademark Office*